(12) United States Patent
Salter et al.

(10) Patent No.: US 11,945,330 B2
(45) Date of Patent: Apr. 2, 2024

(54) BIDIRECTIONAL ENERGY TRANSFER SYSTEMS AND METHODS FOR PROVIDING ENHANCED HOUSEHOLD TRANSIENT LOAD SUPPORT

(71) Applicant: FORD GLOBAL TECHNOLOGIES, LLC, Dearborn, MI (US)

(72) Inventors: Stuart C. Salter, White Lake, MI (US); Ryan O'Gorman, Beverly Hills, MI (US); Peter Phung, Windsor (CA); Katherine Howard-Cone, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/492,751

(22) Filed: Oct. 4, 2021

(65) Prior Publication Data

US 2023/0104157 A1  Apr. 6, 2023

(51) Int. Cl.
*B60L 55/00* (2019.01)
*B60L 50/60* (2019.01)
*B60L 53/63* (2019.01)
*B60L 53/66* (2019.01)
*B60L 58/12* (2019.01)
*H02J 3/32* (2006.01)

(52) U.S. Cl.
CPC ............ *B60L 55/00* (2019.02); *B60L 50/60* (2019.02); *B60L 53/63* (2019.02); *B60L 53/665* (2019.02); *B60L 58/12* (2019.02); *H02J 3/322* (2020.01)

(58) Field of Classification Search
CPC .......... B60L 55/00; B60L 50/60; B60L 58/12; B60L 53/665; B60L 53/63; H02J 3/322
USPC ........................................................ 307/10.1
See application file for complete search history.

(56) References Cited

U.S. PATENT DOCUMENTS

| | | | |
|---|---|---|---|
| 9,684,358 B2 | 6/2017 | Kim et al. | |
| 9,855,853 B2 | 1/2018 | Cun | |
| 10,938,211 B2 | 3/2021 | Bell | |
| 2011/0077789 A1* | 3/2011 | Sun | H02J 3/14 700/291 |
| 2013/0162025 A1 | 6/2013 | Momose et al. | |

* cited by examiner

*Primary Examiner* — Daniel Cavallari
*Assistant Examiner* — Dru M Parries
(74) *Attorney, Agent, or Firm* — David B. Kelley; Carlson, Gaskey & Olds, P.C.

(57) ABSTRACT

Systems and methods may coordinate and provide bidirectional energy transfer events between electrified vehicles and households or other structures, such as for supporting transient loads associated with the households/structures, for example. Vehicle information, driving habit information, and household information may be leveraged for providing enhanced transient load capability controls that permit increased appliance usage without increasing energy costs. The proposed systems/methods may particularly allow for bidirectional energy transfer support of high load appliances for increasing a user's comfort, pleasure, and convenience.

19 Claims, 9 Drawing Sheets

BIDIRECTIONAL ENERGY TRANSFER SYSTEMS AND METHODS FOR PROVIDING ENHANCED HOUSEHOLD TRANSIENT LOAD SUPPORT

TECHNICAL FIELD

This disclosure relates generally to systems and methods for coordinating and providing bidirectional energy transfers between vehicles and households or other structures, and more particularly to supporting enhanced usage settings of transient loads for a specific amount of time based, at least in part, on an amount of excess energy available from a vehicle traction battery pack.

BACKGROUND

Electrified vehicles differ from conventional motor vehicles because they are selectively driven by one or more traction battery pack powered electric machines. The electric machines can propel the electrified vehicles instead of, or in combination with, an internal combustion engine.

Plug-in type electrified vehicles include one or more charging interfaces for charging the traction battery pack. Plug-in type vehicles are typically charged while parked at a charging station or some other utility power source. Plug-in type vehicles can also be used to support household transient loads during electrical power outages.

SUMMARY

A bidirectional energy transfer system according to an exemplary aspect of the present disclosure includes, among other things, a traction battery pack, and a control module programmed to generate a transient load increased usage setting recommendation for a home appliance based at least on an amount of excess energy available from the traction battery pack.

In a further non-limiting embodiment of the foregoing system, the control module is further programmed to calculate the amount of excess energy available from the traction battery pack based at least on a current state of charge of the traction battery pack and a total planned utilization of the traction battery pack.

In a further non-limiting embodiment of either of the foregoing systems, the control module is further programmed to calculate an increased energy load that can be provided by the traction battery pack for supporting an increased usage of the home appliance based at least on household energy usage information and the amount of excess energy available from the traction battery pack.

In a further non-limiting embodiment of any of the foregoing systems, the control module is further programmed to derive an application use per unit time and measure of the home appliance from a lookup table.

In a further non-limiting embodiment of any of the foregoing systems, the control module is further programmed to generate the transient load increased usage setting recommendation based on the application use per unit time and measure of the home appliance.

In a further non-limiting embodiment of any of the foregoing systems, the control module is a component of an electrified vehicle that is powered by the traction battery pack.

In a further non-limiting embodiment of any of the foregoing systems, the control module is further programmed to control a bidirectional energy transfer output of the traction battery pack in response to receiving an input signal indicating a selection of the transient load increased usage setting recommendation.

In a further non-limiting embodiment of any of the foregoing systems, the control module is further programmed to transmit an alert to the home appliance for automatically adjusting a setting of the home appliance or an alert to a user of the bidirectional energy transfer system for manually adjusting the setting of the home appliance.

In a further non-limiting embodiment of any of the foregoing systems, the control module is programmed to control a bidirectional energy transfer output from the traction battery pack to a structure for powering an increased usage setting of the home appliance.

In a further non-limiting embodiment of any of the foregoing systems, the home appliance is an air conditioning unit, a furnace, a hot tub, or a water heater.

In a further non-limiting embodiment of any of the foregoing systems, the transient load increased usage setting recommendation is in the form of one or more options available for prioritizing a duration and/or amplitude of power from the traction battery pack for powering an increased usage of the home appliance.

In a further non-limiting embodiment of any of the foregoing systems, the transient load increased usage setting recommendation is in the form of degrees lower or higher the home appliance can be set at for a specific amount of time.

A method according to another exemplary aspect of the present disclosure includes, among other things, controlling, via a control module of a bidirectional energy transfer system, a bidirectional energy transfer output from a traction battery pack of an electrified vehicle to a structure that is separate from the electrified vehicle. Controlling the bidirectional energy transfer output includes commanding a greater amount of energy output from the traction battery pack to the structure for supporting an increased usage setting of a home appliance of the structure.

In a further non-limiting embodiment of the foregoing method, the structure is a household associated with the electrified vehicle, and the home appliance is an air conditioning unit or a furnace.

In a further non-limiting embodiment of either of the foregoing methods, controlling the bidirectional energy transfer output includes generating a transient load increased usage setting recommendation for the home appliance based at least on an amount of excess energy available from the traction battery pack.

In a further non-limiting embodiment of any of the foregoing methods, the transient load increased usage setting recommendation in the form of degrees lower or higher the home appliance can be set at for a specific amount of time.

In a further non-limiting embodiment of any of the foregoing methods, controlling the bidirectional energy transfer output includes deriving an application use per unit time and measure of the home appliance and generating the transient load increased usage setting recommendation based on the application use per unit time and measure of the home appliance.

In a further non-limiting embodiment of any of the foregoing methods, controlling the bidirectional energy transfer output includes receiving a signal indicative of a user selection of the transient load increased usage setting recommendation and controlling the bidirectional energy transfer output from the traction battery pack to the structure for supporting the increase usage setting in response to receiving the signal.

In a further non-limiting embodiment of any of the foregoing methods, the method includes commanding the home appliance to automatically adjust a setting of the home appliance or commanding an alert to a user of the bidirectional energy transfer system to manually adjust the setting of the home appliance.

In a further non-limiting embodiment of any of the foregoing methods, commanding the greater amount of energy output from the traction battery pack to the structure is performed only when a difference between an amount of available energy from the traction battery pack and a total energy requirement of the structure exceeds a predefined threshold.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to systems and methods for coordinating and providing bidirectional energy transfer events between electrified vehicles and households or other structures, such as for supporting transient loads associated with the households/structures, for example. Vehicle information, driving habit information, and household information may be leveraged for providing enhanced transient load capability controls that permit increased appliance usage without increasing energy costs. The proposed systems/methods may particularly allow for bidirectional energy transfer support of high load appliances for increasing a user's comfort, pleasure, and convenience. These and other features of this disclosure are discussed in greater detail in the following paragraphs of this detailed description.

Figure 1:
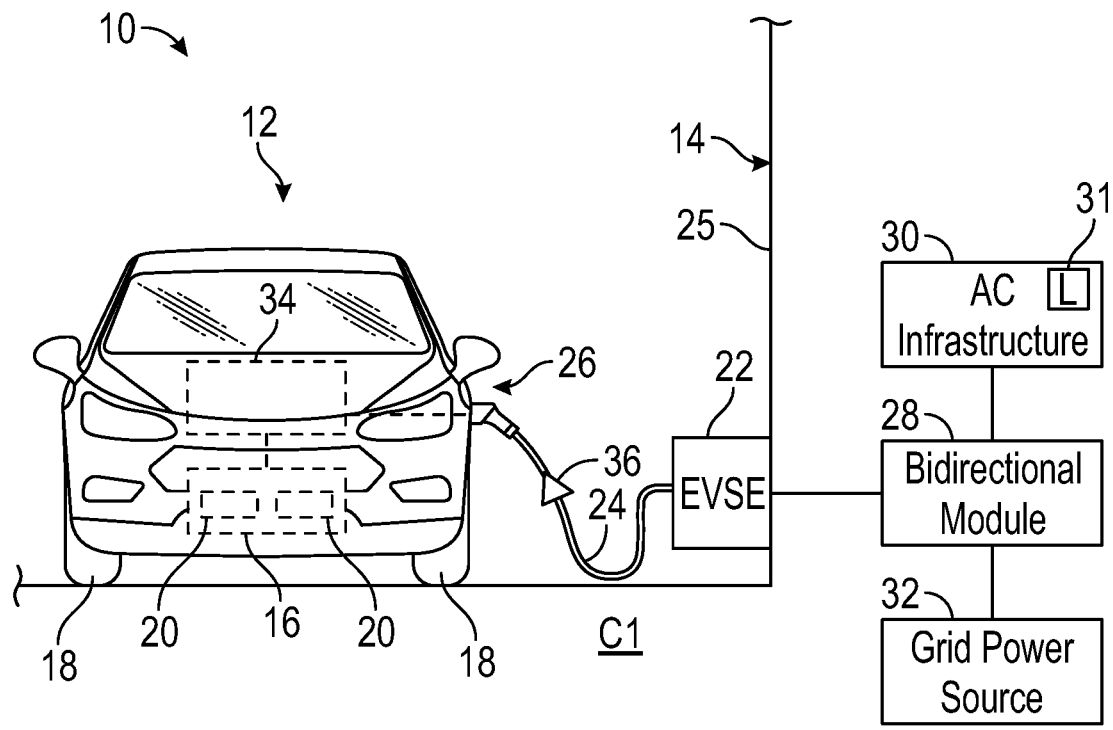
FIG. 1 schematically illustrates a first configuration of a bidirectional energy transfer system.
Figure 2:
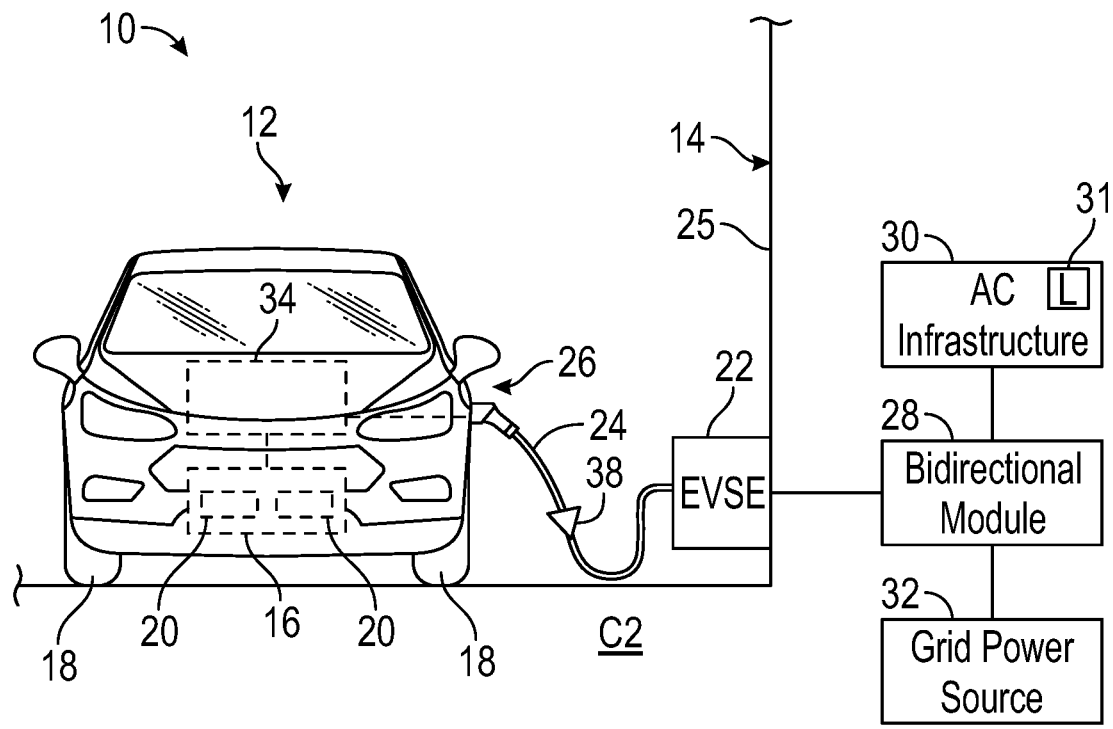
FIG. 2 schematically illustrates a second configuration of the bidirectional energy transfer system of FIG. 1.

FIGS. 1 and 2 schematically illustrate an exemplary bidirectional energy transfer system 10 (hereinafter "the system 10") for bidirectionally transferring energy between an electrified vehicle 12 and a structure 14. The system 10 enables the bidirectional transfer of energy from the electrified vehicle 12 to the structure 14 or vice versa. The structure 14 may be a residential building, a commercial building, a parking garage, a charging station, or any other type of structure that is capable of receiving or transferring energy. In an embodiment, the structure 14 is a residential household that functions as a "home location" of the electrified vehicle 12.

Although a specific component relationship is illustrated in the figures of this disclosure, the illustrations are not intended to limit this disclosure. The placement and orientation of the various components of the depicted system are shown schematically and could vary within the scope of this disclosure. In addition, the various figures accompanying this disclosure are not necessarily drawn to scale, and some features may be exaggerated or minimized to emphasize certain details of a particular component.

In an embodiment, the electrified vehicle 12 is a plug-in type electrified vehicle (e.g., a plug-in hybrid electric vehicle (PHEV) or a battery electric vehicle (BEV)). The electrified vehicle 12 includes a traction battery pack 16 that is part of an electrified powertrain capable of applying a torque from an electric machine (e.g., an electric motor) for powering drive wheels 18 of the electrified vehicle 12. Therefore, the electrified powertrain of the electrified vehicle 12 may electrically propel the set of drive wheels 18 either with or without the assistance of an internal combustion engine.

The electrified vehicle 12 of FIGS. 1-2 is schematically illustrated as a car. However, other vehicle configurations are also contemplated. The teachings of this disclosure may be applicable for any type of vehicle as the electrified vehicle 12. For example, the electrified vehicle 12 could be configured as a car, a truck, a van, a sport utility vehicle (SUV), etc.

Although shown schematically, the traction battery pack 16 may be configured as a high voltage traction battery pack that includes a plurality of battery arrays 20 (i.e., battery assemblies or groupings of battery cells) capable of outputting electrical power to one or more electric machines of the electrified vehicle. Other types of energy storage devices and/or output devices may also be used to electrically power the electrified vehicle 12.

The electrified vehicle 12 may interface with the structure 14 through an electric vehicle supply equipment (EVSE) 22 in order to perform bidirectional energy transfers of the system 10. In an embodiment, the EVSE 22 is a wall box or smart wall charger that may be mounted to a wall 25 of the structure 14. A charge cable 24 may operably connect the EVSE 22 to a charge port assembly 26 of the electrified vehicle 12 for transferring energy between the electrified vehicle 12 and the structure 14. The charge cable 24 may be configured to provide any level of charging (e.g., Level 1 AC charging, Level 2 AC charging, DC charging, etc.).

The EVSE 22 may be operably connected to an AC infrastructure 30 of the structure 14 through a bidirectional energy transfer module 28. Although shown separately from the EVSE 22 in FIG. 1, the bidirectional energy transfer module 28 and the EVSE 22 could be integrated together as part of common module.

Various electrical loads 31, such as household appliance loads, for example, may be associated with the AC infrastructure 30. The electrical loads 31 may be referred to as transient loads of the AC infrastructure 30 and could include loads associated with common kitchen appliances, washers, dryers, dishwashers, water heaters, hot tubs, pools, air conditioning units, furnaces, household lighting, etc.

Power from a grid power source 32 (e.g., AC power, solar power, wind power, or combinations thereof) and/or power from the electrified vehicle 12 may be selectively communicated to the bidirectional energy transfer module 28. The bidirectional energy transfer module 28 is configured to aid with the bidirectional transfers of electrical energy between the electrified vehicle 12 and the structure 14. The bidirectional energy transfer module 28 may include various equipment, including but not limited to an AC/DC converter, a common HVDC bus, an isolation transformer, a DC/DC converter, a control module, etc. for configuring the structure 14 to either receive electrical energy from the electrified vehicle 12 for supporting the electrical loads 31 or send electrical energy to the electrified vehicle 12 for charging the traction battery pack 16. The bidirectional energy transfer module 28 may further be configured to transfer energy from the grid power source 32 to the AC infrastructure 30.

The electrified vehicle 12 may include a bidirectional power transfer system 34 configured for further enabling the bidirectional transfer of power between the electrified vehicle 12 and the structure 14. The bidirectional power transfer system 34 may be operably connected between the charge port assembly 26 and the traction battery pack 16 of the electrified vehicle 12. The bidirectional power transfer system 34 may include various equipment, such as a charger, a converter, a motor controller (which may be referred to as an inverter system controller or ISC), etc. for configuring the electrified vehicle 12 for either receiving electrical energy from the structure 14 for charging the traction battery pack 16 or communicating electrical energy from the traction battery pack 16 to the structure 14. The bidirectional power transfer system 34 may additionally be configured to transfer energy between the traction battery pack 16 and one or more electric motors of the electrified vehicle 12.

A non-limiting example of a suitable bidirectional power transfer system that may be employed for use within the electrified vehicle 12 for achieving bidirectional power transfers is disclosed within US Patent Publication No. 2020/0324665, assigned to Ford Global Technologies, LLC, the disclosure of which is incorporated herein by reference. However, other bidirectional power transfer systems could also be utilized for achieving the bidirectional power transfers within the scope of this disclosure.

FIG. 1 schematically illustrates a first configuration C1 of the system 10. During the first configuration C1, power may be transferred from the structure 14 to the electrified vehicle 12, such as for charging the traction battery pack 16 of the electrified vehicle 12. The direction of energy transfer during the first configuration C1 is schematically depicted by arrow 36.

FIG. 2 schematically illustrates a second configuration C2 of the system 10. During the second configuration C2, power may be transferred from the traction battery pack 16 of the electrified vehicle 12 to the structure 14. The direction of energy transfer during the second configuration C2 is schematically illustrated by arrow 38. In this way, the electrified vehicle 12 may be employed as a backup energy storage system for at least partially powering the electrical loads 31 of the structure 14, such as when power from the grid power source 32 is temporarily unavailable as a result of electrical blackouts, for example.

The electrified vehicle 12 may also be selectively employed to assist the grid power source 32 with powering the electrical loads 31 when certain conditions are met. For example, the system 10 may be configured to selectively transfer energy from the electrified vehicle 12 to the structure 14 for at least partially powering the electrical loads 31 during demand charge conditions of the grid power source 32. Demand charge conditions are conditions in which the utility service provider adds a surcharge to the costs associated with receiving energy from the grid power source 32 during peak usage times.

The system 10 may further be configured to selectively transfer an additional amount of energy from the electrified vehicle 12 to the structure 14 for powering desired energy usage increases (e.g., increased/decreased parametric deltas for achieving comfort/convenience) associated with one or more of the electrical loads 31 of the structure 14. The system 10 may therefore provide increased transient load control capabilities designed for increasing a user's comfort/ pleasure when residing at the structure 14 without increasing energy costs that would normally be attributed to the grid power source 32. These and other aspects of the system 10 are further detailed below.

Figure 3:
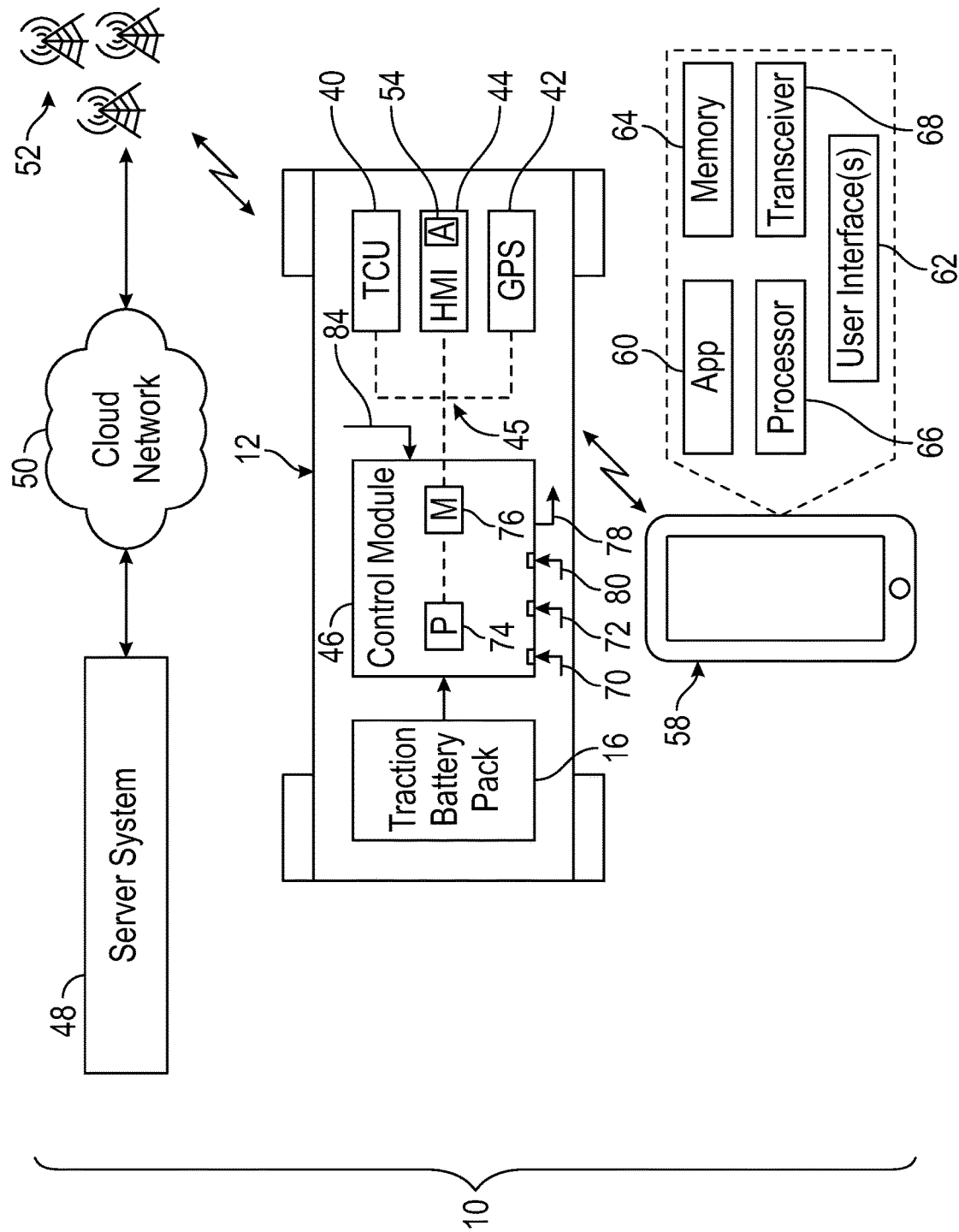
FIG. 3 schematically illustrates exemplary aspects of a bidirectional energy transfer system from the perspective of an electrified vehicle of the system.

Additional aspects of the system 10 of FIGS. 1-2 are further detailed from the perspective of the electrified vehicle 12 in FIG. 3. In particular, FIG. 3 schematically illustrates features that enable the system 10 to coordinate bidirectional energy transfer events between the electrified vehicle 12 and the structure 14, such as for supporting an increased/enhanced usage of one or more of the electrical loads 31, for example.

As part of the system 10, the electrified vehicle 12 may include a telecommunications module 40, a global positioning system (GPS) 42, a human machine interface (HMI) 44, and a control module 46. These and other components may be interconnected and in electronic communication with one another over a communication bus 45 of the electrified vehicle 12. The communication bus 45 may be a wired communication bus such as a controller area network (CAN) bus, or a wireless communication bus such as Wi-Fi, Bluetooth®, Ultra-Wide Band (UWB), etc.

The telecommunications module 40 may be configured for achieving bidirectional communications with a cloud-based server system 48. The server system 48 may include various servers that store data that may be accessed by the system 10. The telecommunications module 40 may communicate over a cloud network 50 (e.g., the internal to obtain various information stored on the server system 48 or to provide information to the server system 48 that can subsequently be accessed by the electrified vehicle 12 (and/or other participating vehicles or structures of the system 10). The server system 48 can identify, collect, and store user data associated with the electrified vehicle 12 for validation purposes. Upon an authorized request, data may be subsequently transmitted to the telecommunications module 40 via one or more cellular towers 52 or some other known communication technique (e.g., Wi-Fi, Bluetooth®, data connectivity, wireless mesh networks, lower power long range networks, smart utility networks, etc.). Upon commands from the control module 46, the telecommunications module 40 can receive data from the server system 48 or can communicate data back to the server system 48 via the cellular tower(s) 52. Although not necessarily shown or described in this highly schematic embodiment, numerous other components may enable bidirectional communications between the electrified vehicle 12 and the server system 48.

In a first embodiment, a user/owner of the electrified vehicle 12 may interface with the server system 48 using the HMI 44. For example, the HMI 44 may be equipped with an application 54 (e.g., FordPass™ or another similar web-based application) adapted for interfacing with the server system 48. The HMI 44 may be located within a passenger cabin of the electrified vehicle 12 and may include various user interfaces for displaying information to the vehicle occupants and for allowing the vehicle occupants to enter information into the HMI 44. The vehicle occupants may interact with the user interfaces presentable on the HMI 44 via touch screens, tactile buttons, audible speech, speech synthesis, etc.

In another embodiment, the user/owner of the electrified vehicle 12 could alternatively or additionally interface with the server system 48 for coordinating bidirectional energy transfer events using a personal electronic device 58 (e.g., a smart phone, tablet, computer, wearable smart device, etc.). The personal electronic device 58 may include an application 60 (e.g., FordPass™ or another similar application) that includes programming to allow the user to employ one or more user interfaces 62 for setting or controlling certain aspects of the system 10. The application 60 may be stored in a memory 64 of the personal electronic device 58 and may be executed by a processor 66 of the personal electronic device 58. The personal electronic device 58 may additionally include a transceiver 68 that is configured to communicate with the server system 48 over the cellular tower(s) 52 or some other wireless link.

The GPS 42 is configured to pinpoint locational coordinates of the electrified vehicle 12. The GPS 42 may utilize geopositioning techniques or any other satellite navigation techniques for estimating the geographic position of the electrified vehicle 12 at any point in time. The GPS 42 may additionally store and/or track driving habit information of the user/owner who is associated with the electrified vehicle 12. The driving habit information may include historical drive routes used by the user, planned drive routes, frequently visited locations and expected arrival/departures times at each frequently visited location, home location and expected times parked at home location, etc. The driving habit information may alternatively or additionally be stored on the server system 48 and may be accessed via the applications 54, 60.

The control module 46 may include both hardware and software and could be part of an overall vehicle control system, such as a vehicle system controller (VSC), or could alternatively be a stand-alone controller separate from the VSC. In an embodiment, the control module 46 is programmed with executable instructions for interfacing with and commanding operations of various components of the system 10. Although shown as separate modules within the highly schematic depiction of FIG. 3, the telecommunications module 40, the GPS 42, the HMI 44, and the control module 46 could be integrated together as part of common module of the electrified vehicle 12.

The control module 46 may include a processor 74 and non-transitory memory 76 for executing various control strategies and modes associated with the system 10. The processor 74 can be a custom made or commercially available processor, a central processing unit (CPU), or generally any device for executing software instructions. The memory 76 can include any one or combination of volatile memory elements and/or nonvolatile memory elements.

The processor 74 may be operably coupled to the memory 76 and may be configured to execute one or more programs stored in the memory 76 of the control module 46 based on various inputs received from other devices, such as inputs from the server system 48, the telecommunications module 40, the GPS 42, the HMI 44, the traction battery pack 16, etc. In an embodiment, the application 54 (e.g., FordPass™ or another similar application), which includes programming for allowing the vehicle user to employ one or more user interfaces within the HMI 44 for setting or controlling certain aspects of the system 10, may be stored in the memory 76 and may be executed by the processor 74 of the control module 46. Alternatively, the control module 46 may be configured to communicate and interface with the personal electronic device 58 for coordinating and/or executing certain aspects of the system 10 through the application 60.

The control module 46 may receive and process various inputs for coordinating and providing transient load increased usage setting recommendations 78 when transferring energy from the electrified vehicle 12 to the structure 14. The transient load increased usage setting recommendations 78 are designed to provide enhanced user comfort/pleasure at the structure 14 by promoting increased power usage from the electrified vehicle 12 to the structure 14 for powering one or more home appliances associated with the structure 14. For example, as further detailed below, the transient load increased usage setting recommendations 78 may include recommendations for utilizing excess energy available from the traction battery pack 16 to power the increased usage of an air conditioner for cooling the structure 14, the increased usage of a furnace for heating the structure 14, the increased usage of a water heater of the structure 14 for providing hot water, the increased usage of a hot tub located at the structure 14, etc.

The transient load increased usage setting recommendations 78 may provide options for powering a given home appliance at a desired setting for a specific amount of time. In an embodiment, the transient load increased usage setting recommendations 78 may be presented to the user in the form of degrees lower/higher the appliance can be set at for a specific amount of time (e.g., 5 degrees/hour for 8 hours, 10 degrees/hour for 5 hours, etc.). In another embodiment, the transient load increased usage setting recommendations 78 may be presented to the user in the form of pressure increase/decrease that can be output, such as by a pump of the appliance, for a specific amount of time (e.g., an additional output of 10 psi for 8 hours, an additional output of 20 psi/hour for 5 hours, etc.).

A first input to the control module 46 may include vehicle prognostic information 70 received from various components/subsystems of the electrified vehicle 12. The vehicle prognostic information 70 may include information such as the current charging status of the electrified vehicle (e.g., on-plug versus off-plug, current power transfer rate if on-plug, etc.), current state of charge (SOC) of the traction battery pack 16, estimated travel range of the electrified vehicle 12, available bidirectional energy transfer capability of the traction battery pack 16, etc.

Another input to the control module 46 may include driving habit information 72 of the user associated with the electrified vehicle 12. The driving habit information 72 may include historical drive routes used by the user, upcoming drive routes planned by the user, frequently visited locations and expected arrival/departures times, home location and expected times parked at home location, etc. The driving habit information 72 may be received from the GPS 42 or from the server system 48 via the applications 54, 60.

Another input to the control module 46 may include household information 80 associated with the structure 14. The household information 80 may include pre-programmed or machine learning energy profiles for various home appliances that are part of the electrical loads 31, historical energy usage (e.g., energy logs) of the structure 14, smart meter readings (e.g., current consumption of total energy in readings through voltage, current, and power factor levels), smart appliance information (e.g., status of appliance use, notifications, energy profiles, energy use per unit of appliance usage (e.g., 1 kWh per 2 degrees, etc.), other appliance inputs (e.g., current sensor and temperature sensor information, etc.), customer preference information (e.g., customer energy transfer settings received from the applications 54, 60, etc.), etc.

In an embodiment, based at least on the vehicle prognostic information 70, the driving habit information 72, and the household information 80, the control module 46 may be programmed to determine an amount of excess energy available from the traction battery pack 16 for powering an increased energy usage setting associated with one or more home appliances that are part of the electrical loads 31 of the structure 14. The excess energy available from the traction battery pack 16 is the amount of energy available after subtracting the energy necessary for achieving a planned utilization of the traction battery pack 16 from the current amount of energy stored in the traction battery pack 16. The planned utilization of the traction battery pack 16 may be derived based on the calculated energy amounts necessary for powering the electrified vehicle 12 for travel along planned upcoming travel routes, powering transient loads during bidirectional energy transfer events with the structure 14, maintaining predefined range reserves, offsetting demand charges of the grid power source, etc.

In another embodiment, based at least in part on the amount of excess energy available and the household information 80 (e.g., the energy use per unit of appliance usage), the control module 46 may be programmed to determine a specific amount of time a given appliance associated with the electrical loads 31 of the structure 14 can be powered for achieving a desired setting change (e.g., an increase/decrease of temperature, pressure, etc.) of the appliance. This may be referred to calculating the application use per unit time and measure. The application use per unit time and measure may be derived from one or more lookup tables that can be stored in the memory 76 of the control module 46.

The control module 46 may further be programmed to generate the transient load increased usage setting recommendations 78 after calculating the application use per unit time and measure. The transient load increased usage setting recommendations 78 may be presented to the user at the HMI 44 or the personal electronic device 58, for example. The transient load increased usage setting recommendations 78 may be presented in the form of various options that the user may choose between for prioritizing the time/duration or amplitude of powering the home appliance for providing the increased usage and comfort. The transient load increased usage setting recommendations 78 may be presented to the user in the form of degrees lower/higher the appliance can be set at for a specific amount of time (e.g., 5 degrees/hour for 8 hours, 10 degrees/hour for 5 hours, etc.), for example.

Figure 4:
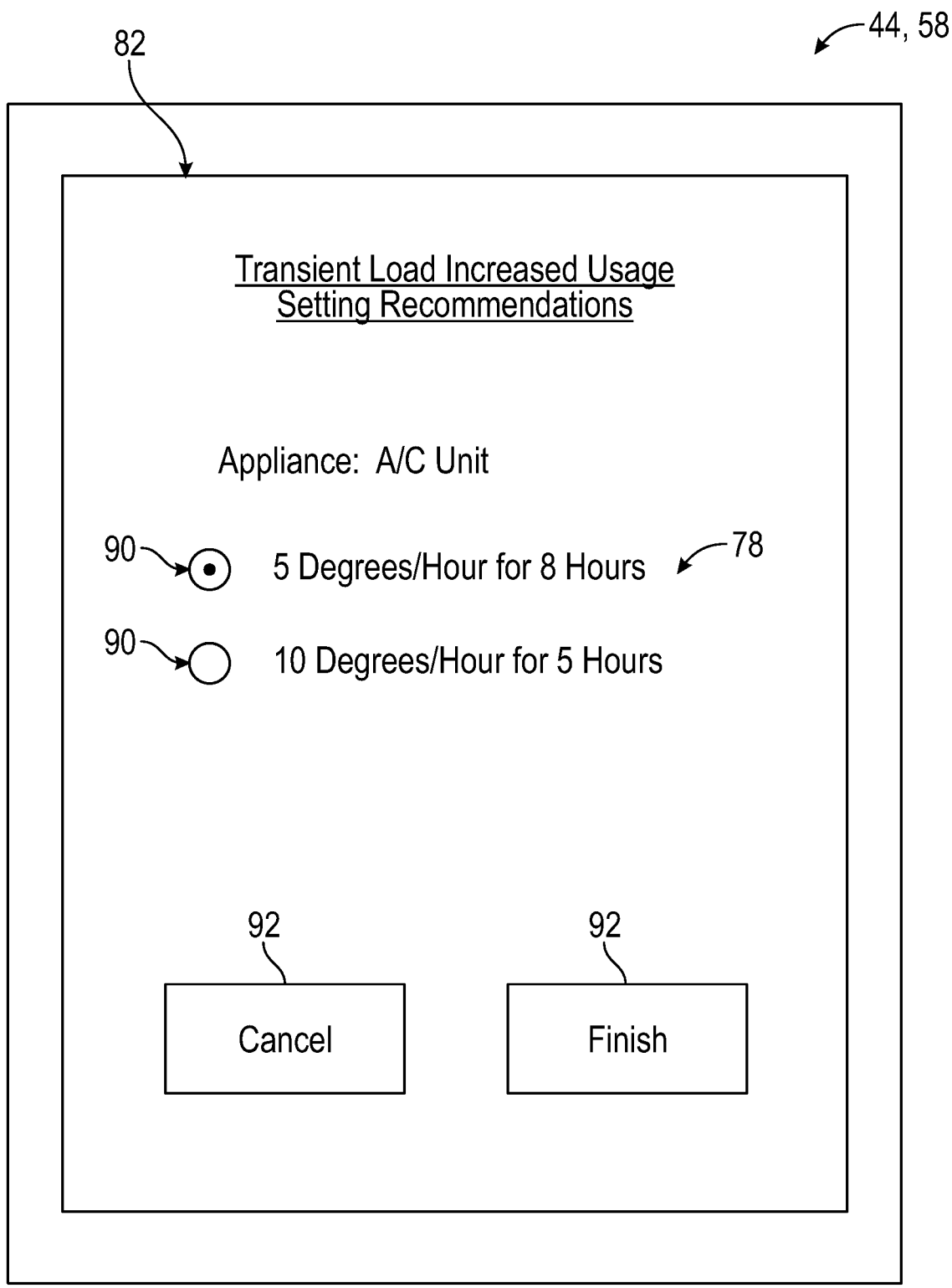
FIG. 4 illustrates an exemplary user interface for providing enhanced transient load setting recommendations to a user of a bidirectional energy transfer system.

An exemplary user interface 82 that can be presented to the user on the HMI 44 or the personal electronic device 58 for providing the transient load increased usage setting recommendations 78 is schematically illustrated in FIG. 4. The user interface 82 may provide the user with a series of prompts for selecting one of the presented transient load increased usage setting recommendations 78. In an embodiment, the user interface 82 includes toggles 90 for allowing the user to select the desired setting and buttons 92 for allowing the user to cancel or confirm the desired selection. Although shown as toggles and buttons, the user interface 82 could employ button, toggles, sliding scales, or any other features or combinations of features that would allow the user to select the desired setting.

The control module 46 may be programmed to receive an input signal 84 from either the HMI 44 or the personal electronic device 58 when the user has selected one of the transient load increased usage setting recommendations 78. In response to receiving the input signal 84, the control module 46 may control the output of the traction battery pack 16, such as by interfacing with and controlling the functionality of the bidirectional power transfer system 34, for pushing a greater amount of energy to the structure 14 for supporting the increased appliance usage. The control module 46 may additionally either instruct the user to adjust the appliance settings or communicate directly with the appliance for adjusting its settings, if the appliance is so equipped.

In yet another embodiment, the control module 46 may be programmed to communicate various alerts to the user during bidirectional energy transfer events. For example, the control module 46 may command an alert to the user when the amount of excess energy available from the traction battery pack 16 for supporting the increased appliance usage is below a predefined threshold or when the system 10 is usable to meet household transient loads.

Figure 5:
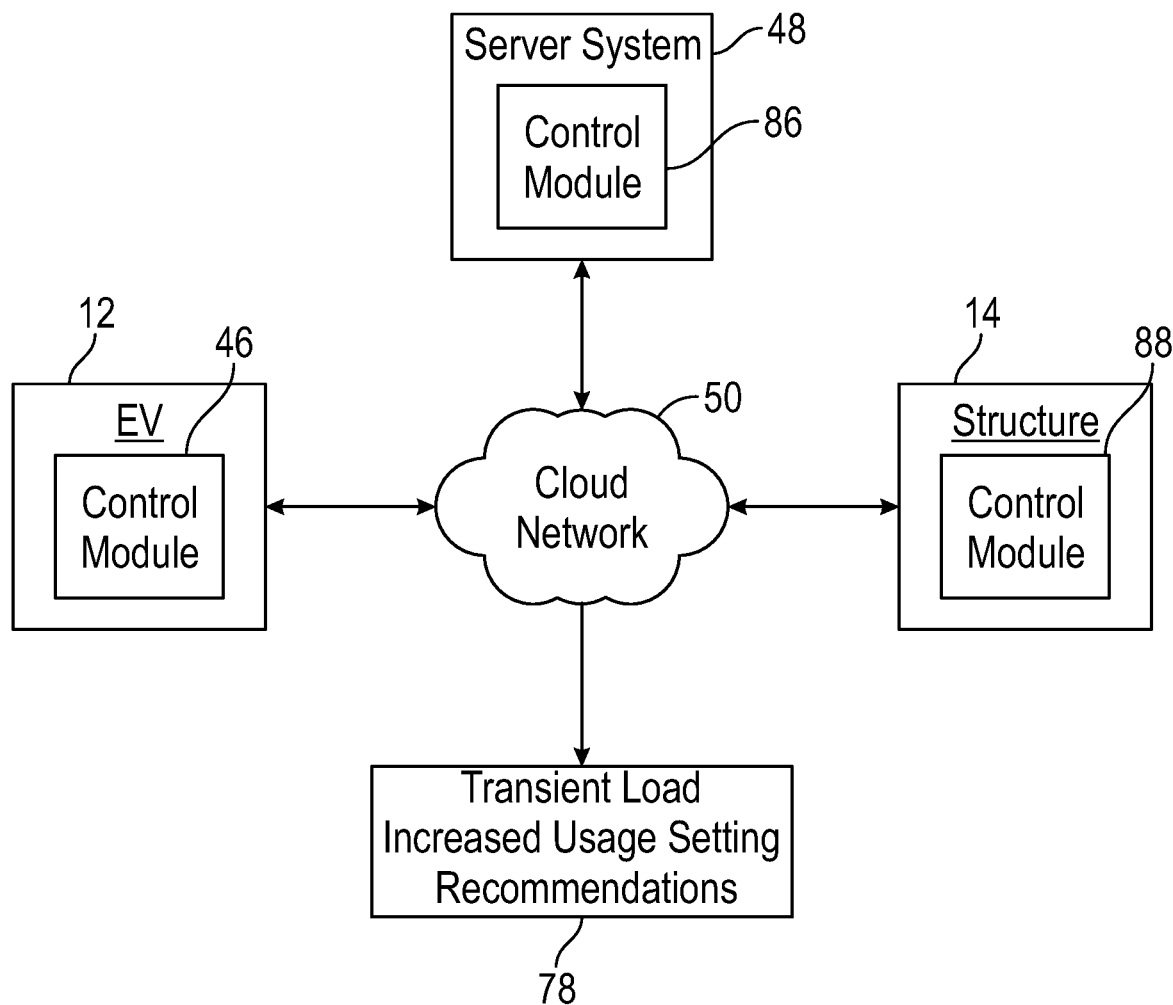
FIG. 5 schematically illustrates a control system of another exemplary bidirectional energy transfer system.
Figure 6A:
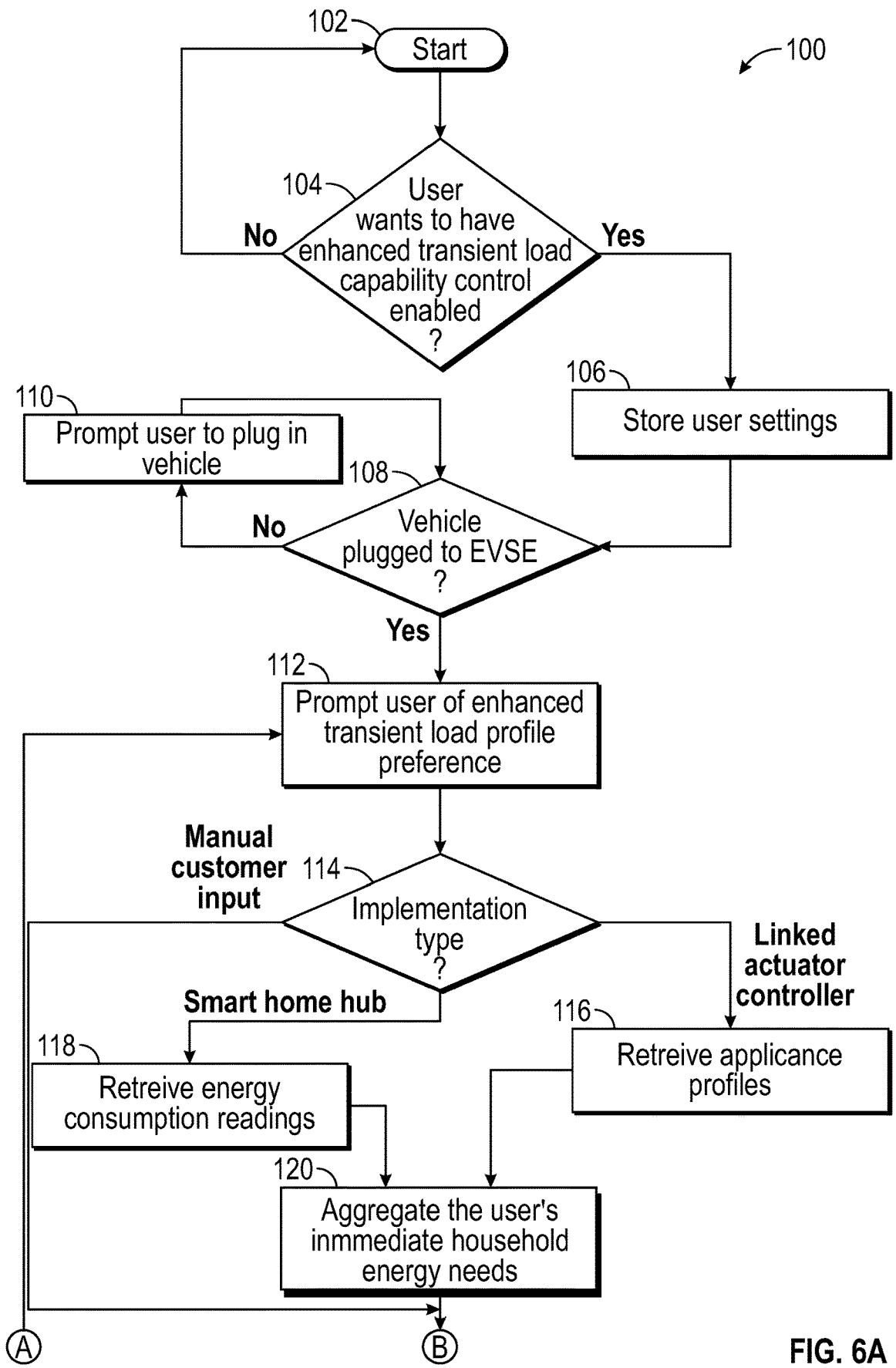
FIGS. 6A, 6B, 6C, 6D, and 6E illustrate a flow chart of an exemplary method for controlling a bidirectional energy transfer system for providing enhanced transient load support during bidirectional energy transfer events.
Figure 6B:
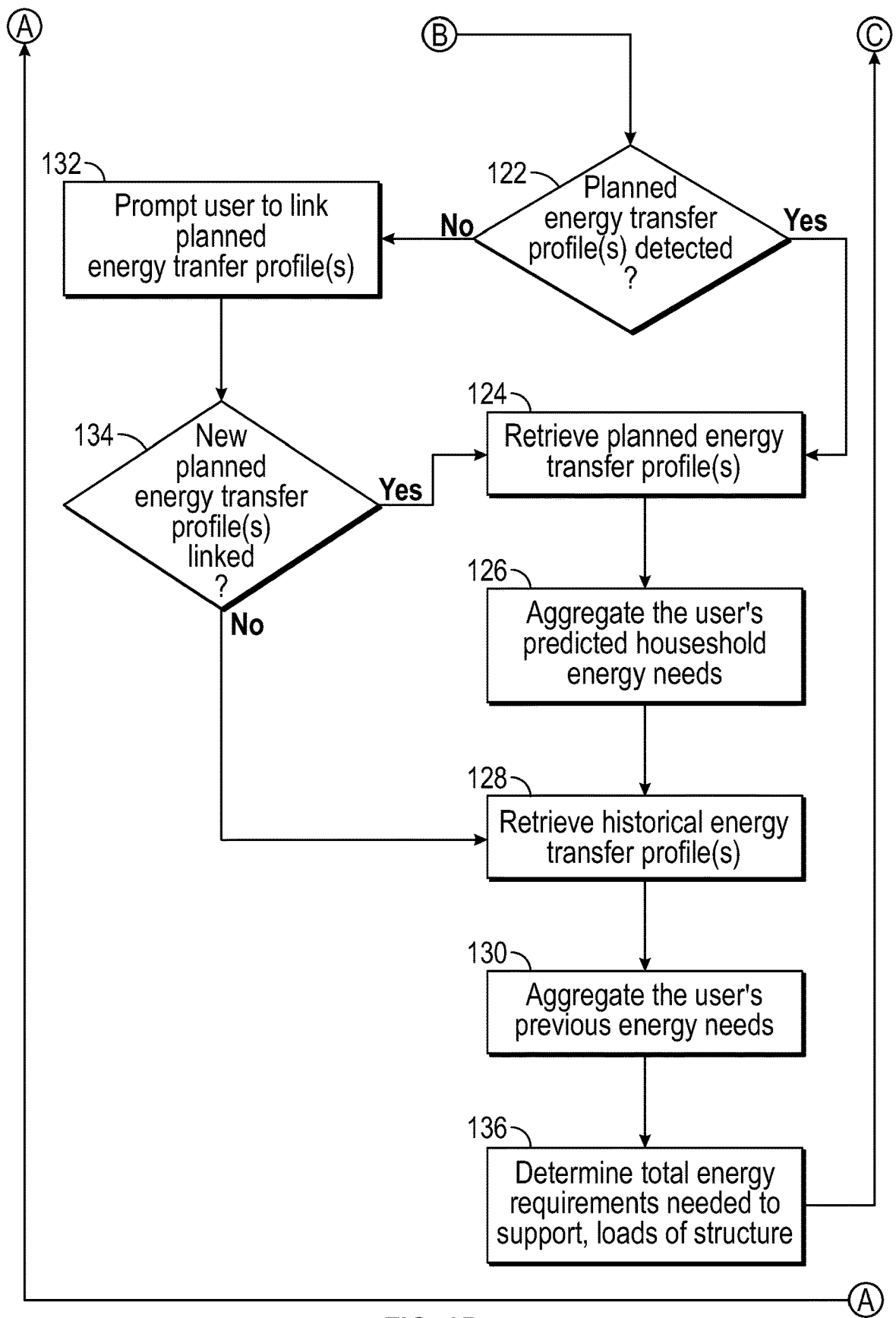
Figure 6C:
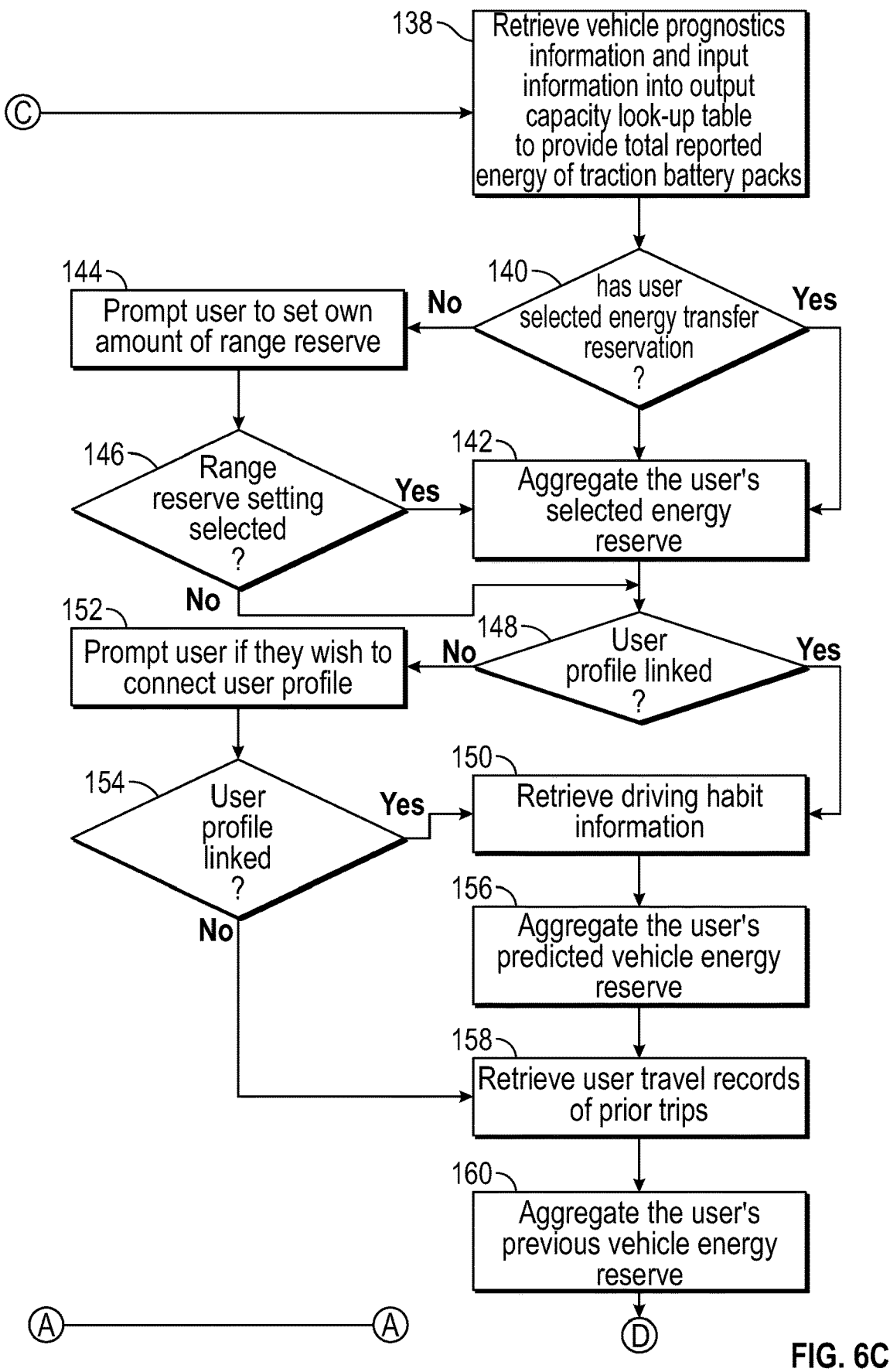
Figure 6D:
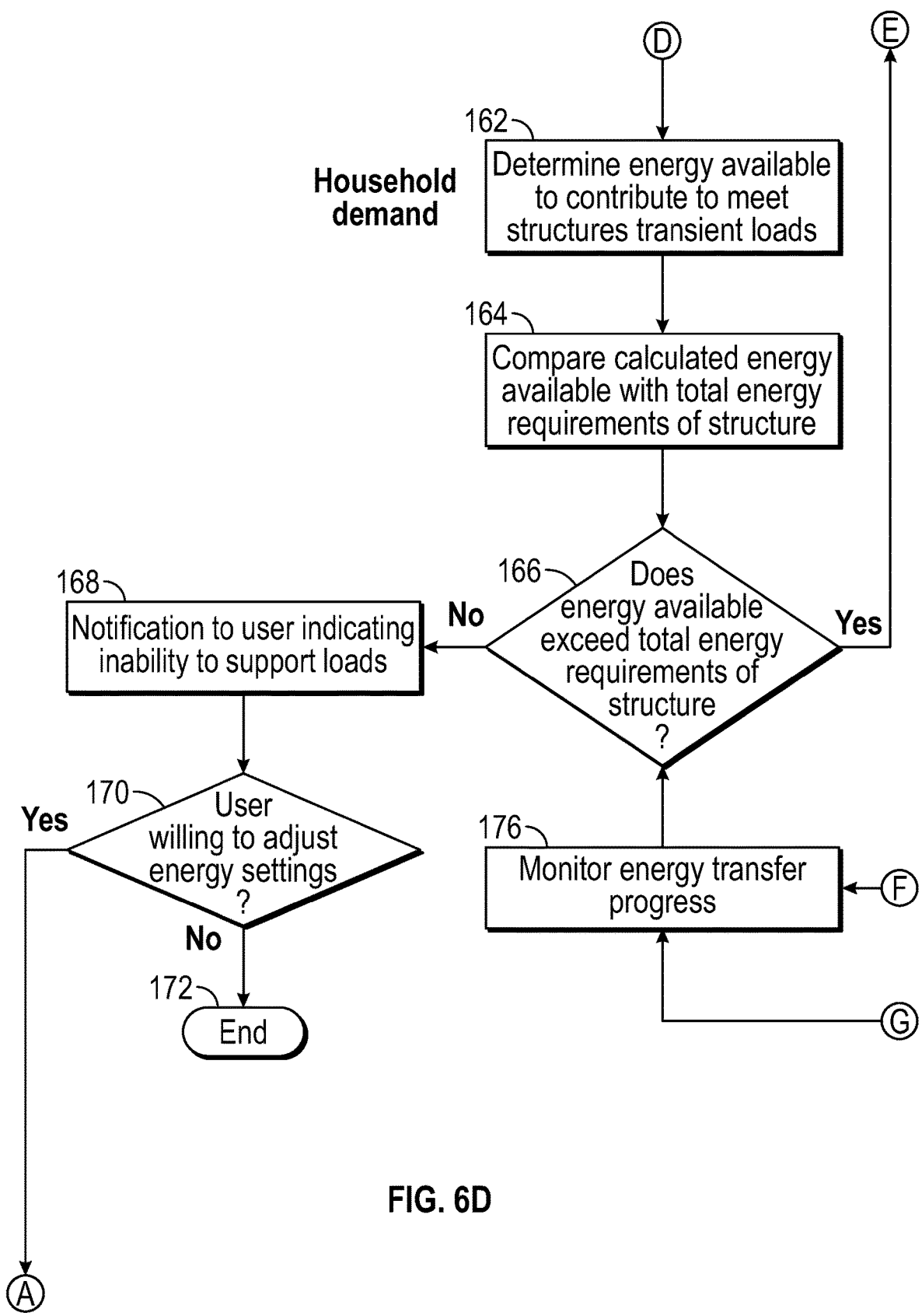
Figure 6E:
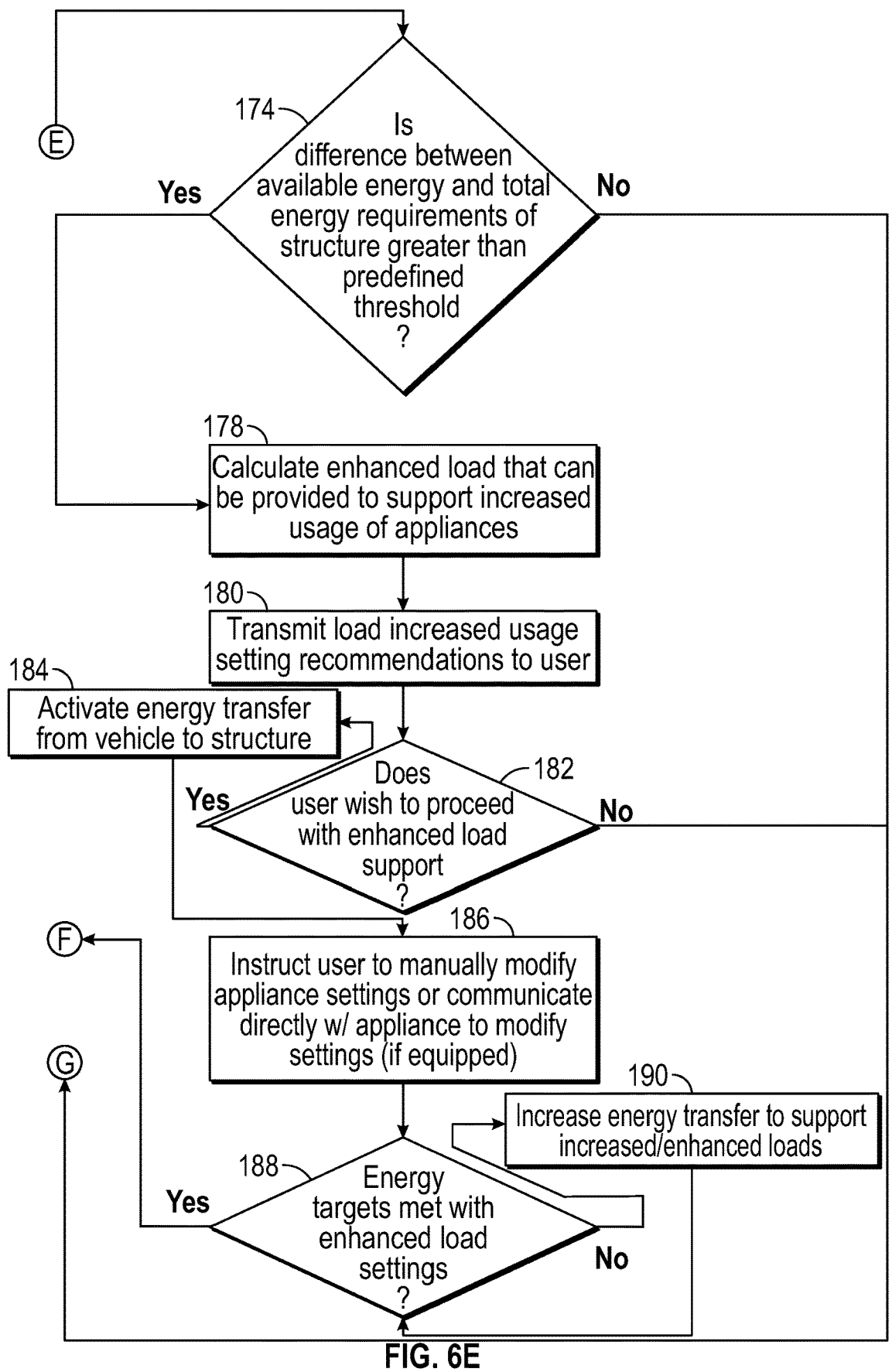

In the embodiments described above, the control module 46 of the electrified vehicle 12 may be configured to function as the communications hub of the system 10. However, other embodiments are also contemplated within the scope of this disclosure. For example, as shown in FIG. 5, a control module 86 of the server system 48 (e.g., a cloud-based control module) and/or a control module 88 associated with the structure 14 could be configured to function as the communications hub of the system 10. In yet another embodiment, the respective control modules of each of the electrified vehicle 12, the structure 14, and the server system 48 may operate together over the cloud network 50 to establish a control system for controlling the functionality of the system 10, such as for coordinating and providing increased transient load capabilities during bidirectional energy transfer events by generating and providing the transient load increased usage setting recommendations 78.

FIGS. 6A-6E, with continued reference to FIGS. 1-5, schematically illustrate in flow chart form an exemplary method 100 for coordinating and providing enhanced transient load capability control during bidirectional energy transfer events between the electrified vehicle 12 and the structure 14. The system 10 may be configured to employ one or more algorithms adapted to execute at least a portion of the steps of the exemplary method 100. For example, the method 100 may be stored as executable instructions in the memory 76 of the control module 46, and the executable instructions may be embodied within any computer readable medium that can be executed by the processor 74 of the control module 46. The method 100 could alternatively or additionally be stored as executable instructions in the memories of the control module 86 of the server system 48 and/or the control module 88 of the structure 14.

The exemplary method 100 may begin at block 102. At block 104, the method 100 may determine whether the user of the electrified vehicle 12 desires to support enhanced transient load capability controls when transferring energy from the electrified vehicle 12 to the structure 14. If YES, the method 100 may proceed to block 106 by storing the selected user settings. In an embodiment, the user settings are saved on the server system 48. However, other implementations are contemplated within the scope of this disclosure.

At block 108, the method 100 may determine whether or not the electrified vehicle 12 is plugged-in (e.g., whether the charge cable 24 is currently connected to the charge port assembly 26 of the electrified vehicle 12 and the EVSE 22). If NO, the user of the electrified vehicle 12 may be prompted to plug-in the electrified vehicle 12 at block 110. Alternatively, if a YES flag is returned at block 108, the method 100 may proceed to block 112 by prompting the user to select his/her desired enhanced transient load profile preferences. The prompt may be provided on a user interface that can be presented within the HMI 44 or the personal electronic device 58, for example.

The method 100 may next determine what type of enhanced transient load profile preference has been selected at block 114. If a localized appliance implementation has been selected, the method 100 may retrieve appliance information from one or more selected appliances at block 116. Alternatively, if an energy transfer distribution implementation for the entire structure 14 has been selected, the method 100 may retrieve energy consumption (e.g., smart meter) readings from the structure 14 at block 118. The immediate total energy needs of the structure 14 may then be aggregated at block 120. Alternatively, if a manual user input implementation is selected at block 114, the method 100 may proceed directly to block 122.

At block 122, the method 100 may determine whether any planned energy transfer profiles have been detected. Planned energy transfer profiles may include appliance settings that are scheduled to occur at a later time, such as those from a smart thermostat, for example. If YES, the planned energy transfer profiles may be retrieved at block 124, and the user's predicted energy needs for the structure 14 may then be aggregated at block 126.

At block 128, a historical energy transfer profile associated with the structure 14 may be retrieved, such as from the server system 48 or from a smart meter. The historical energy transfer profile may include energy logs of previous usages associated with the structure 14, for example. The user's previous energy needs for the structure 14 may then be aggregated at block 130.

If a NO flag is returned at block 122, the method 100 may proceed to block 132 by prompting the user if they wish to link a planned energy transfer profile. The method 100 may then determine whether a planned energy transfer profile has been linked at block 134. The method 100 may proceed to either block 124 or block 128 from block 134, depending on whether or not a planned energy transfer profile was linked at block 134.

The total energy requirements needed to support the transient loads of the structure 14 may be calculated at block 136. This step may include aggregating the immediate energy needs (from block 120), the predicted energy needs (from block 126), and the previous energy needs (from block 130) associated with the structure 14.

Next, at block 138, the method 100 may retrieve the vehicle prognostic information 70 and output battery-related information from the vehicle prognostic information 70 into an output capacity lookup table to provide a total reported energy of the traction battery pack 16. In an embodiment, the output capacity lookup table is stored in the memory 76 of the control module 46.

The method 100 may determine whether any energy transfer preferences, such as preferences for range reservations, for example, have been selected by the user at block 140. If YES, the method 100 may aggregate the user's selected energy reserve for the traction battery pack 16 at block 142. If NO, the method 100 may proceed to block 144 by prompting the user to select a desired amount of range reserve. The method 100 may then determine whether a range reservation has been selected at block 146. The method 100 may proceed to either block 142 or block 148 from block 144, depending on whether or not a range reservation has been made.

At block 148, the method 100 may determine whether a user profile associated with the owner of the electrified vehicle 12 and/or structure 14 has been linked to the system 10. If YES, the driving habit information 72 associated with the user may be retrieved at block 150. If NO, the method 100 may instead proceed to block 152 by prompting the user as to whether they wish to link a user profile to the system 10. The method 100 may then determine whether a user profile has been linked at block 154. The method 100 may proceed to either block 150 or block 158 from block 154, depending on whether or not a user profile has been linked.

The user's predicted energy reserve of the traction battery pack 16 may be aggregated at block 156. The user's historical driving habits may be analyzed at block 158, and the user's previous energy reserve of the traction battery pack 16 may then be aggregated at block 160.

The portion of energy of the traction battery pack 16 that is available to contribute to the transient loads of the structure 14 may next be calculated at block 162. If the selected energy reserve (from block 142) is less than or equal to the sum of the predicted energy reserve and the previous energy reserve, then the portion of energy of the traction battery pack 16 that is available to contribute may be calculated by subtracting the sum of the predicted energy reserve and the previous energy reserve from the total reported energy of the traction battery pack 16. Otherwise, the selected energy reserve may be simply subtracted from the total reported energy of the traction battery pack 16 to calculate the portion of energy that is available to contribute to the transient loads of the structure 14.

Next, at block 164, the portion of energy of the traction battery pack 16 that is available to contribute to the transient loads of the structure 14 (from block 162) may be compared to the total energy requirements of the structure 14 (from block 136). The method 100 may then, at block 166, determine whether the portion of the energy available from the traction battery pack 16 exceeds the total energy requirements of the structure 14. If NO, the method 100 may proceed to block 168 by notifying the user of the inability to support the transient loads under the current energy settings. The method 100 may determine if the user is willing to adjust the energy settings at block 170. If YES, the method 100 may return to block 112. If NO, the method 100 may end at block 172.

Alternatively, if a YES flag is returned at block 166, the method 100 may proceed to block 174. At this step, the method 100 may determine whether the difference between the portion of available energy of the traction battery pack 16 and the total energy requirements of the structure 14 is greater than a predefined threshold, thus indicating that a significant enough amount of excess energy is available from the traction battery pack 16 for supporting enhanced transient load control. If NO, the method 100 may continue to monitor the energy transfer progress at block 176.

However, if the method 100 determines that the difference between the portion of available energy of the traction battery pack 16 and the total energy requirements of the structure 14 is greater than the predefined threshold, the method 100 may calculate the increased energy load that can be provided by the traction battery pack 16 for supporting a desired amount of increased usage of one or more user-selected home appliances associated with the structure 14 at block 178. This step may include calculating the application use per unit time and measure for each selected home appliance. The application use per unit time and measure may be derived from one or more lookup tables that can be stored in the memory 76 of the control module 46, for example.

The method 100 may then proceed to block 180 by transmitting the transient load increased usage setting recommendations 78 to the user. The transient load increased usage setting recommendations 78 can be presented to the user within the user interface 82 (see FIG. 4) and may provide options for powering a given home appliance at a desired setting for a specific amount of time. In an embodiment, the transient load increased usage setting recommendations 78 may be presented to the user in the form of degrees lower/higher the appliance can be set at for a specific amount of time (e.g., 5 degrees/hour for 8 hours, 10 degrees/hour for 5 hours, etc.).

At block 182, the method 100 confirms whether the user wishes to proceed with the enhanced transient load support. The user may make selections using the buttons 92 of the user interface 82 for confirming his/her desire to support the increased usage of one or more of the transient loads. If a NO flag is returned at block 182, the method 100 may return to block 176.

Alternatively, if a YES flag is returned at block 182, the method 100 may proceed to block 184 by enabling the bidirectional energy transfer from the electrified vehicle 12 to the structure 14. Enabling the bidirectional energy transfer may include commanding the bidirectional power transfer system 34 to increase the amount of energy output from the traction battery pack 16 for supporting the desired increased appliance usage during the energy transfer event. The method 100 may then either instruct the user to adjust the appliance settings manually or communicate directly with the appliance (e.g., if the appliance is smart home/IoT compatible) for adjusting the settings as necessary for achieving the increased appliance usage at block 186.

The method 100 may next determine whether the bidirectional energy transfer targets, including the enhanced transient load usage, have been met at block 188. If YES, the method 100 may return to block 176 for continued analysis and further action. If NO, the method 100 may proceed to block 190 by increasing the bidirectional energy transfer output from the electrified vehicle 12 for supporting the increased usage of the home appliance(s).

The bidirectional energy transfer systems of this disclosure are designed to coordinate and provide bidirectional energy transfer events for supporting household transient loads based on factors such as user driving habits, household energy consumption requirements, and excess energy available from the traction battery pack. The systems/methods may provide recommendations for increasing the energy output from the traction battery pack to support the increased usage of the household transient loads. The systems/methods thereby increase the user's comfort, pleasure, and convenience within the household without increasing utility costs associated with the increased usage.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A bidirectional energy transfer system, comprising:
a traction battery pack; and
a control module programmed to generate a transient load increased usage setting recommendation for a home appliance based at least on an amount of excess energy available from the traction battery pack and an application use per unit time and measure of the home appliance,
wherein the application use per unit time and measure is representative of an amount of time the home appliance can be powered for achieving a user-desired setting change of the home appliance,
wherein the transient load increased usage setting recommendation is presented to a user on a user interface,
wherein the control module is further programmed to control a bidirectional energy transfer output of the traction battery pack for powering an increased usage setting of the home appliance in response to receiving an input signal indicating a selection of the transient load increased usage setting recommendation by the user.

2. The system as recited in claim 1, wherein the control module is further programmed to calculate the amount of excess energy available from the traction battery pack based at least on a current state of charge of the traction battery pack and a total planned utilization of the traction battery pack.

3. The system as recited in claim 2, wherein the control module is further programmed to calculate an increased energy load that can be provided by the traction battery pack for supporting an increased usage of the home appliance based at least on household energy usage information and the amount of excess energy available from the traction battery pack.

4. The system as recited in claim 2, wherein the control module is further programmed to derive the application use per unit time and measure of the home appliance from a lookup table.

5. The system as recited in claim 1, wherein the control module is a component of an electrified vehicle that is powered by the traction battery pack.

6. The system as recited in claim 1, wherein the control module is further programmed to transmit an alert to the home appliance for automatically adjusting a setting of the home appliance or an alert to a user of the bidirectional energy transfer system for manually adjusting the setting of the home appliance.

7. The system as recited in claim 1, wherein the control module is programmed to control the bidirectional energy transfer output from the traction battery pack to a structure for powering the increased usage setting of the home appliance.

8. The system as recited in claim 1, wherein the home appliance is an air conditioning unit, a furnace, a hot tub, or a water heater.

9. The system as recited in claim 1, wherein the transient load increased usage setting recommendation is in the form of one or more options available for prioritizing a duration and/or amplitude of power from the traction battery pack for powering an increased usage of the home appliance.

10. The system as recited in claim 1, wherein the transient load increased usage setting recommendation is in the form of degrees lower or higher the home appliance can be set at for a specific amount of time.

11. The system as recited in claim 1, wherein the transient load increased usage setting recommendations is in the form of a pressure increase/decrease that can be output by a pump of the home appliance for a specific amount of time.

12. The system as recited in claim 2, wherein the total planned utilization of the traction battery pack is derived based on an amount of energy necessary for powering an electrified vehicle along a planned upcoming travel route, an amount of energy necessary for powering transient loads during bidirectional energy transfer events with a structure associated with the home appliance, an amount of energy necessary for maintaining a predefined range reserve of the traction battery pack, and an amount of energy necessary for offsetting a demand charge of a grid power source.

13. A method, comprising:
controlling, via a control module of a bidirectional energy transfer system, a bidirectional energy transfer output from a traction battery pack of an electrified vehicle to a structure that is separate from the electrified vehicle,
wherein controlling the bidirectional energy transfer output includes:
generating a transient load increased usage setting recommendation for a home appliance of the structure based at least on an amount of excess energy available from the traction battery pack and an application use per unit time and measure of the home appliance,
wherein the application use per unit time and measure is representative of an amount of time the home appliance can be powered for achieving a user-desired setting change of the home appliance;
displaying the transient load increased usage setting recommendation on a user interface;
receiving a signal indicative of a user selection of the transient load increased usage setting recommendation; and
controlling the bidirectional energy transfer output from the traction battery pack to the structure for supporting an increased usage setting of the home appliance in response to receiving the signal.

14. The method as recited in claim 13, wherein the structure is a household associated with the electrified vehicle, and the home appliance is an air conditioning unit or a furnace.

15. The method as recited in claim 13, wherein the transient load increased usage setting recommendation in the form of degrees lower or higher the home appliance can be set at for a specific amount of time.

16. The method as recited in claim 13, wherein controlling the bidirectional energy transfer output includes:
deriving the application use per unit time and measure of the home appliance; and
generating the transient load increased usage setting recommendation based on the application use per unit time and measure of the home appliance.

17. The method as recited in claim 13, comprising:
commanding the home appliance to automatically adjust a setting of the home appliance; or
commanding an alert to a user of the bidirectional energy transfer system to manually adjust the setting of the home appliance.

18. The method as recited in claim 13, wherein controlling the bidirectional energy transfer output from the traction battery pack to the structure is performed only when a difference between an amount of available energy from the traction battery pack and a total energy requirement of the structure exceeds a predefined threshold.

19. A bidirectional energy transfer system, comprising:
a traction battery pack; and
a control module programmed to generate a transient load increased usage setting recommendation for a home appliance based at least on an amount of excess energy available from the traction battery pack and an application use per unit time and measure of the home appliance, wherein the application use per unit time and measure is representative of an amount of time the home appliance can be powered for achieving a user-desired setting change of the home appliance,
wherein the transient load increased usage setting recommendation is presented to a user on a user interface in the form of degrees lower or higher the home appliance can be set at for a specific amount of time,
wherein the control module is further programmed to control a bidirectional energy transfer output of the traction battery pack for powering an increased usage setting of the home appliance in response to receiving an input signal indicating a selection of the transient load increased usage setting recommendation by the user.

* * * * *